(12) United States Patent
Dole

(10) Patent No.: US 7,921,536 B2
(45) Date of Patent: Apr. 12, 2011

(54) METHOD OF PRE-ASSEMBLING PIPE COUPLINGS AND JOINING PIPE ELEMENTS

(75) Inventor: Douglas R. Dole, Whitehouse Station, NJ (US)

(73) Assignee: Victaulic Company, Easton, PA (US)

( * ) Notice: Subject to any disclaimer, the term of this patent is extended or adjusted under 35 U.S.C. 154(b) by 0 days.

(21) Appl. No.: 12/406,402

(22) Filed: Mar. 18, 2009

(65) Prior Publication Data
US 2009/0172939 A1   Jul. 9, 2009

Related U.S. Application Data

(63) Continuation of application No. 11/210,376, filed on Aug. 24, 2005, now abandoned.

(51) Int. Cl.
*B23P 11/00* (2006.01)
(52) U.S. Cl. .......................................... 29/463
(58) Field of Classification Search .................. 29/463, 29/525.02, 525.04, 525.01, 428, 235, 237; 285/420, 367, 366, 373, 410, 412, 419; 411/531
See application file for complete search history.

(56) References Cited

U.S. PATENT DOCUMENTS

| | | | |
|---|---|---|---|
| 1,970,078 A | 8/1934 | Dillon | 285/367 |
| 2,752,173 A | 6/1956 | Krooss | 285/129 |
| 3,014,259 A | 12/1961 | Joseph | 24/284 |
| 3,425,473 A | 2/1969 | Knowlton | |
| 3,680,619 A | 8/1972 | Sparks | |
| 3,794,361 A | 2/1974 | Westberg | 285/367 |
| 4,034,788 A | 7/1977 | Melone | |
| 4,064,921 A | 12/1977 | Kose | |
| 4,137,610 A | 2/1979 | Hoen | |
| 4,258,361 A | 3/1981 | Hydes et al. | 345/635 |
| 4,258,941 A | 3/1981 | Sands | 285/197 |
| 4,966,395 A | 10/1990 | Hendrickson | 285/12 |
| 6,171,039 B1 | 1/2001 | Seurujarvi | |
| 6,231,286 B1 | 5/2001 | Bogatz et al. | 411/371.1 |
| 7,690,698 B1 * | 4/2010 | Curran | 285/367 |

FOREIGN PATENT DOCUMENTS

| | | |
|---|---|---|
| EP | 06773665.2 | 1/2009 |
| FR | 138312 | 6/1957 |

* cited by examiner

*Primary Examiner* — John C Hong
(74) *Attorney, Agent, or Firm* — Ballard Spahr LLP

(57) ABSTRACT

A method for assembling a pipe coupling and a method of joining pipe elements in end to end relation using the pre-assembled pipe coupling. The pipe coupling is formed of segments joined end to end by fasteners. Retention elements positioned on the fasteners hold the segments in spaced apart relation. The retention elements have a first surface that engages the fastener and a second surface that engages the segment to inhibit the motion of the segments relative to the fasteners. The method includes engaging the fasteners with the segments and engaging the retention elements with the fasteners and the segments to position and hold the segments in spaced apart relation. Pipe elements are inserted between the segments and force is applied to the segments which overcomes the resistance of the retention elements to move the segments into engagement with the pipe elements.

19 Claims, 10 Drawing Sheets

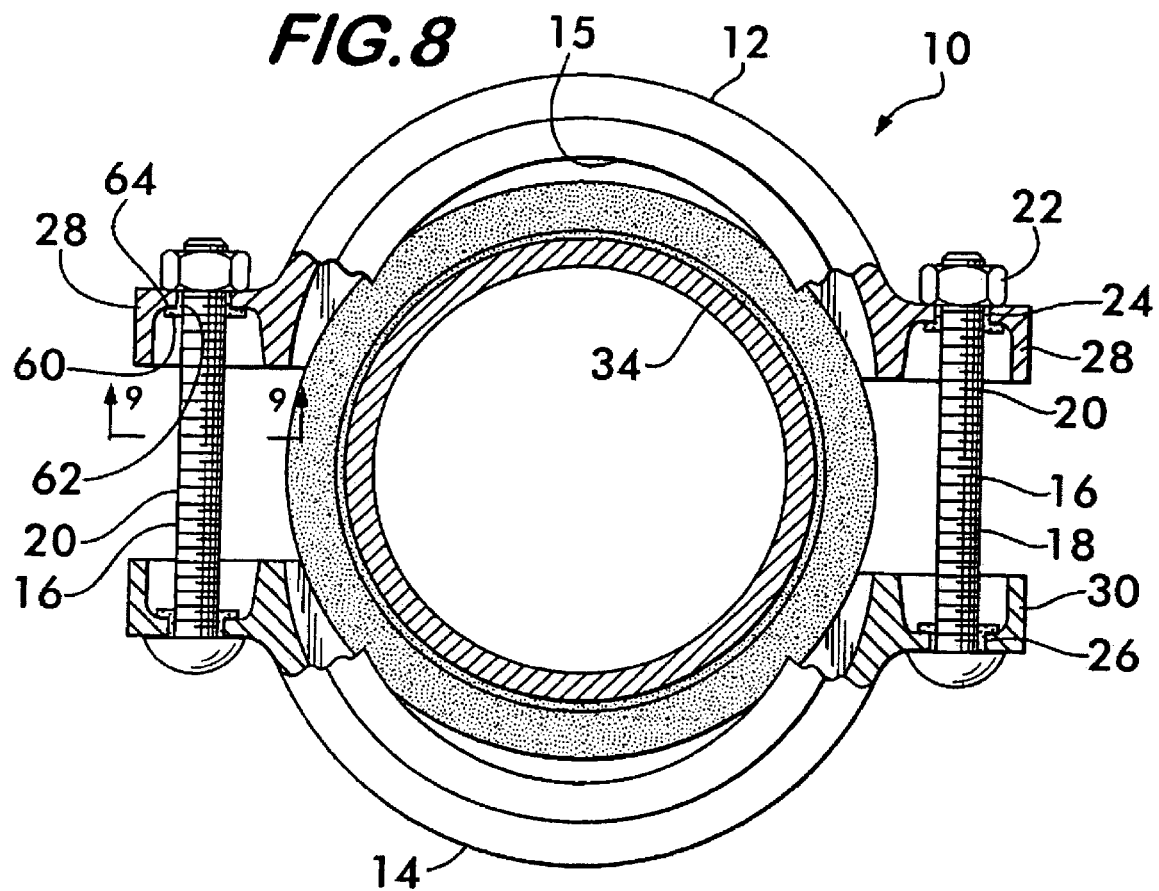
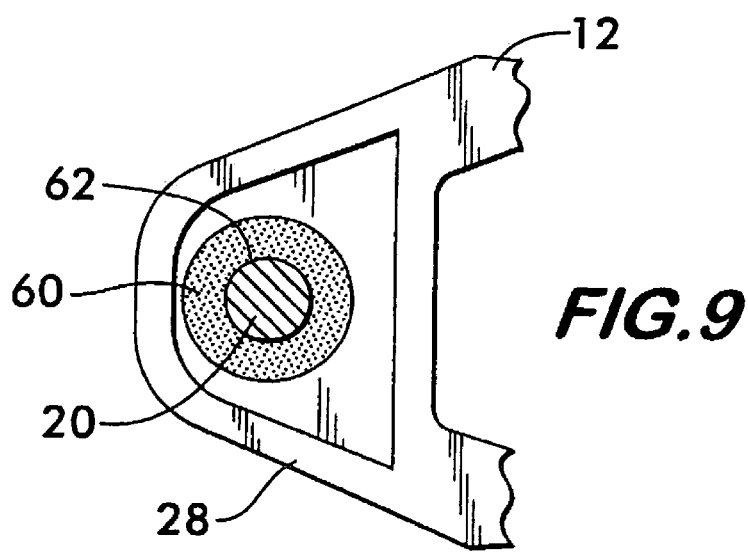

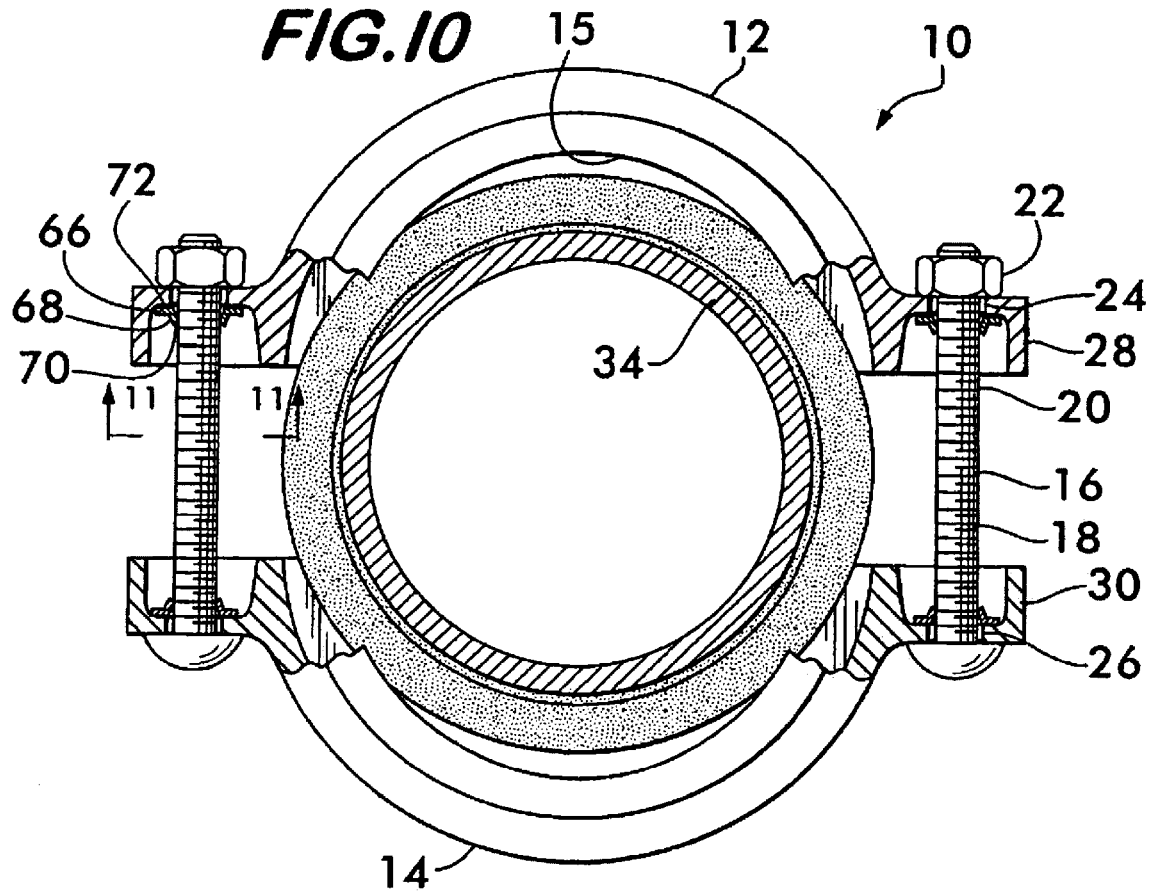
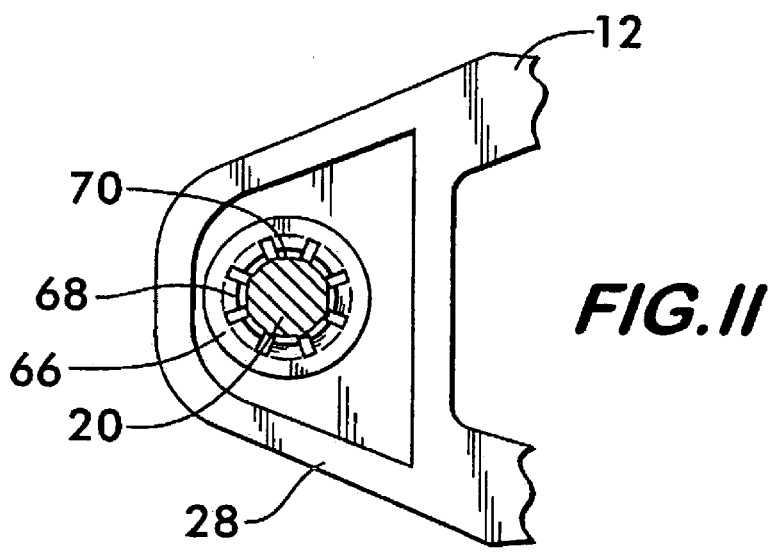

METHOD OF PRE-ASSEMBLING PIPE COUPLINGS AND JOINING PIPE ELEMENTS

CROSS REFERENCE TO RELATED APPLICATION

This application is a continuation of and claims the benefit of U.S. patent application Ser. No. 11/210,376, filed Aug. 24, 2005 now abandoned.

FIELD OF THE INVENTION

This invention relates to methods for assembling pipe couplings before use and using the preassembled pipe couplings to connect pipe elements in end to end relation.

BACKGROUND OF THE INVENTION

Mechanical couplings for joining pipe elements in end to end relation find widespread use throughout industry for creating piping networks, used for example, in fire suppression sprinkler systems in warehouses, office buildings and the like.

Such couplings comprise two or more interconnectable segments that are positionable circumferentially surrounding the end portions of the co-axially aligned pipe elements. The term "pipe element" is used herein to describe any pipe-like item or component having a pipe like form. Pipe elements include pipe stock, pipe fittings such as elbows, caps and tees as well as fluid control components such as valves, reducers, strainers, restrictors, pressure regulators and the like.

Each mechanical coupling segment comprises a housing having arcuate surfaces which project radially inwardly from the housing and engage plain end pipe elements or circumferential grooves that extend around each of the pipe elements to be joined. Engagement between the arcuate surfaces and the pipe elements provides mechanical restraint to the joint and ensures that the pipe elements remain coupled even under high internal pressure and external forces. The housings define an annular channel that receives a gasket or seal, typically an elastomeric ring which engages the ends of each pipe element and cooperates with the segments to provide a fluid tight seal. The segments have connection members, typically in the form of lugs which project outwardly from the housings. The lugs are adapted to receive fasteners, such as nuts and bolts, which are adjustably tightenable to draw the segments toward one another.

Installation of a coupling to form a pipe joint can be a tedious and time consuming process when mechanical couplings are used. Typically, the coupling is received by the technician with the segments bolted together and the ring seal captured within the segments' channels. The technician first disassembles the coupling by unbolting it, removes the ring seal, lubricates it (if not pre-lubricated) and places it around the ends of the pipe elements to be joined. Installation of the ring seal requires that it be lubricated and stretched to accommodate the pipe elements, an often difficult and messy task, as the ring seal is usually stiff and the lubrication makes manual manipulation of the seal difficult. With the ring seal in place on both pipe elements, the segments are then placed one at a time straddling the ends of the pipe elements and capturing the ring seal against them. During placement, the segments engage the seal, the arcuate surfaces are aligned with the grooves, the bolts are inserted through the lugs, the nuts are threaded onto the bolts and tightened, drawing the coupling segments toward one another, compressing the seal and engaging the arcuate surface within the grooves.

As evident from the previous description, installation of mechanical pipe couplings according to the prior art requires that the technician typically handle at least seven individual piece parts (and more when the coupling has more than two segments), and must totally disassemble and reassemble the coupling. Significant time, effort and expense would be saved if the technician could install a mechanical pipe coupling without first totally disassembling it and then reassembling it, piece by piece.

SUMMARY OF THE INVENTION

The invention concerns a method of assembling a pipe coupling formed of a first and a second segment joined to one another in end to end relation by first and second fasteners located at opposite ends of the segments. The method comprises:

(a) engaging the first and second fasteners with the ends of the first segment;

(b) engaging first retention elements respectively with the first and second fasteners and the first segment, the retention elements contacting both the fasteners and the first segment so as to inhibit relative motion between the first segment and the first and second fasteners;

(c) engaging second retention elements respectively with the first and second fasteners, the second retention elements being positioned in spaced apart relation from the first retention elements;

(d) engaging the second segment with the first and second fasteners and the second retention elements, the second retention elements inhibiting relative motion between the second segment and the fasteners, thereby holding the first and second segments in spaced apart relation from one another; and (e) securing the second segment to the first and second fasteners.

In one embodiment, engaging the first and second fasteners with the ends of the first segment comprises positioning first and second bolts through respective first and second openings in the ends of the first segment.

In one embodiment, engaging the second segment with the first and second fasteners comprises positioning the first and second bolts though respective first and second openings in the ends of the second segment.

In one embodiment, securing the second segment to the first and second fasteners comprises engaging a first nut with the first fastener and a second nut with the second fastener.

The method according to the invention also includes a method of joining pipe elements end to end. The method comprises:

(a) inserting a first pipe element between the first and second segments;

(b) inserting a second pipe element between the first and second segments;

(c) applying force to the first and second segments so as to overcome resistance of the retention elements and move the first and second segments toward each other and into engagement with the pipe elements to effect a joint therebetween.

In one embodiment, the force is applied by tightening the fasteners.

BRIEF DESCRIPTION OF THE DRAWINGS

FIG. 8 is a partial sectional side view of a pipe coupling having another embodiment of a stop assembly;

FIG. 9 is a view taken at line 9-9 of FIG. 8;

FIG. 10 is a partial sectional side view of a pipe coupling having another embodiment of a stop assembly;

FIG. 11 is a view taken at line 11-11 of FIG. 10;

DETAILED DESCRIPTION OF PREFERRED EMBODIMENTS

Figure 1:
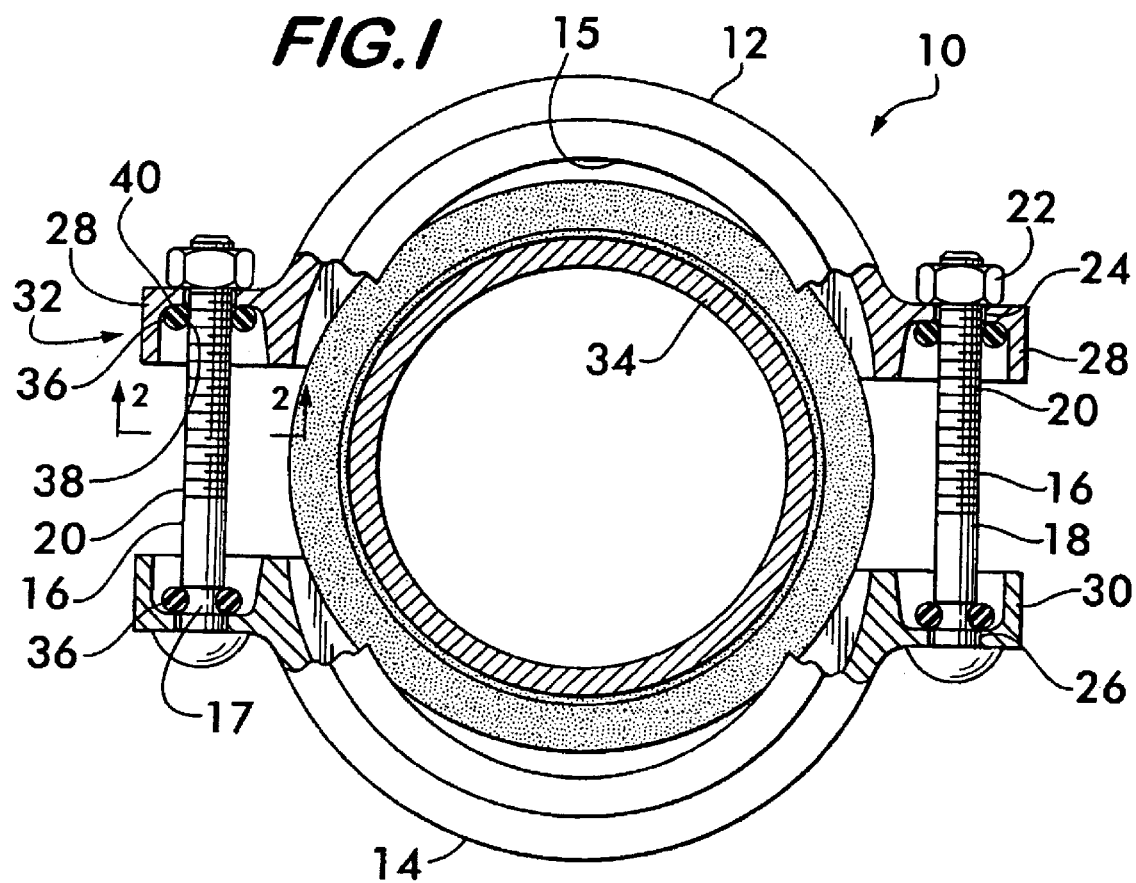
FIG. 1 is a partial sectional side view of a pipe coupling pre-assembled according to the method of the invention and having coupling segments maintained in spaced apart relation by a stop assembly.

FIG. 1 shows a pipe coupling 10 having coupling segments 12 and 14 positioned in facing relation with one another. The segments have arcuate surfaces 15 that engage the ends of pipe elements for securing them in end to end relationship. Segments 12 and 14 are joined to one another by fasteners 16, typically comprising a bolt 18 having a threaded shank 20 that engages a nut 22.

The bolts 18 extend through openings 24 and 26 in the body of the segments, the body often including lugs 28 and 30 designed to receive and engage the nut and bolt. Lugs 28 and 30 are configured so as to align the openings 24 and 26 to receive the shank 20 of the bolt 18.

Figure 3:
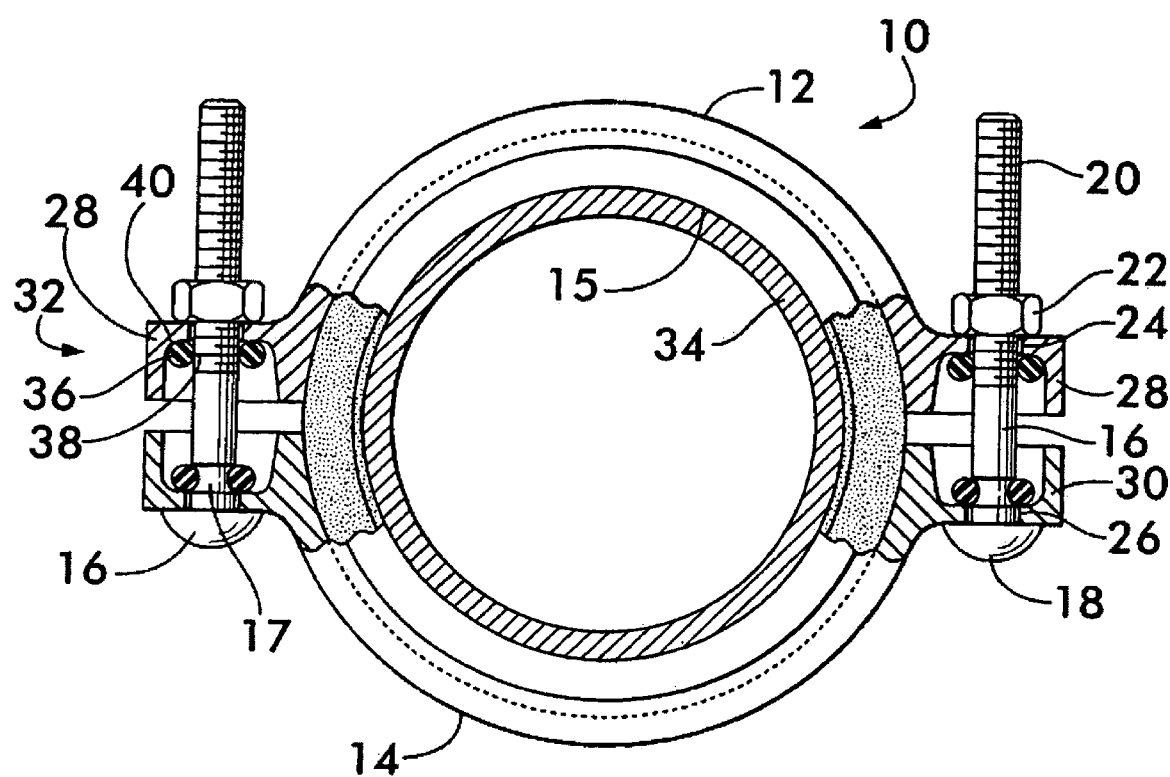
FIG. 3 is a side view of the pipe coupling of FIG. 1 wherein the coupling segments have been moved into engagement with a pair of pipe elements according to the method of the invention.

Coupling 10 includes a stop assembly 32 that limits the motion of the shank 20 through the openings in a body such as 24 and 26. This is useful for efficient assembly of the pipe joint as it allows the coupling 10 to be pre-assembled at the factory with the coupling segments 12 and 14 maintained in spaced apart relation by the stop assembly. The spaced apart relation allows the coupling to receive the pipe elements without disassembly, thereby reducing the number of loose parts which a technician must handle when assembling the joint and decreasing the labor and time required. FIG. 1 shows the coupling 10 with the segments 12 and 14 in spaced apart relation ready to receive pipe elements, and FIG. 3 illustrates the pipe coupling engaging pipe elements 34 to form a pipe joint, the pipe elements having been inserted between the coupling segments 12 and 14 while in the spaced apart configuration. It may be advantageous to modify the coupling segments to facilitate insertion of the pipe elements between them. Such modifications may include, for example, forming notches in the arcuate surfaces adjacent to the lugs to provide clearance for the pipe elements, or providing arcuate surfaces that do not extend completely around the segment.

The various embodiments of stop assemblies are described below. All of the embodiments include a retention element that is positionable on the fastener shank. The retention element has a surface portion that engages the shank to hold it in a predetermined position on the shank. The retention element further includes another surface portion that is engageable with the body having the openings (in these examples, the bodies being the coupling segments). Engagement between the other surface portion and the body limits the motion of the shank through the opening and supports the body, for example, in spaced apart relation to another body.

Figure 2:
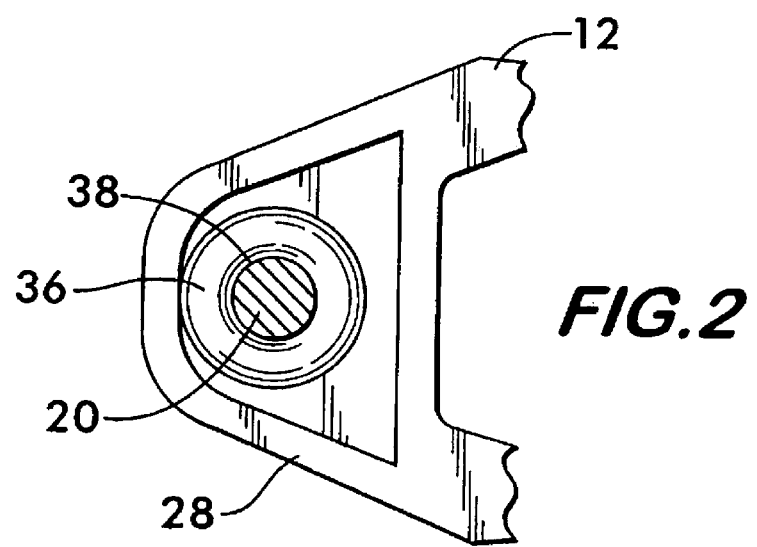
FIG. 2 is a view taken at line 2-2 of FIG. 1.

FIGS. 1 and 2 show a stop assembly 32 having a retention element in the form of an O-ring 36. O-ring 36 has an inwardly facing circumferential surface 38 that engages the shank 20 and a flank surface 40 that engages the lug 28 of the coupling segment 12. The O-ring is formed from elastomeric material and is sized so that its inner diameter is smaller than the outer diameter of shank 20, resulting in a tight interference fit between the O-ring and the fastener 16. The elasticity of the O-ring allows it to hold tightly to the shank, and when used as a pair on one or both fasteners 16, the O-rings support the coupling segments in spaced apart relation as shown in FIG. 1. The grip of the O-rings with the fastener is such as to maintain the coupling segments 12 and 14 in spaced relation for shipping, handling and installation on pipe elements, but, upon application of sufficient force to the coupling segments, the O-rings are movable along the fastener or fasteners to allow the coupling segments to move toward one another and engage the pipe elements 34 as shown in FIG. 3. Movement of the O-rings may be effected manually, for example, by pushing the coupling segments toward each other, or by tightening the fasteners and using screw action between the nut 22 and bolt 18 to draw the coupling segments into engagement with the pipe elements.

Figure 4:
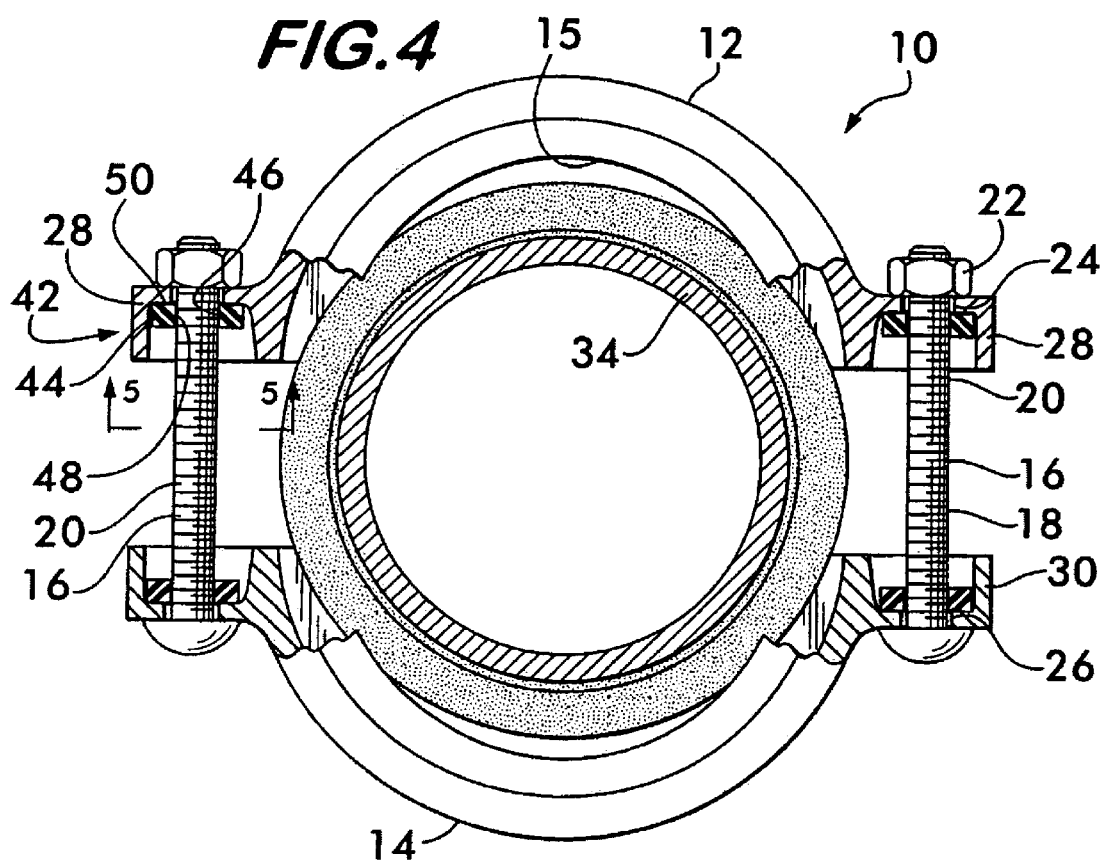
FIG. 4 is a partial sectional side view of a pipe coupling having another embodiment of a stop assembly.
Figure 5:
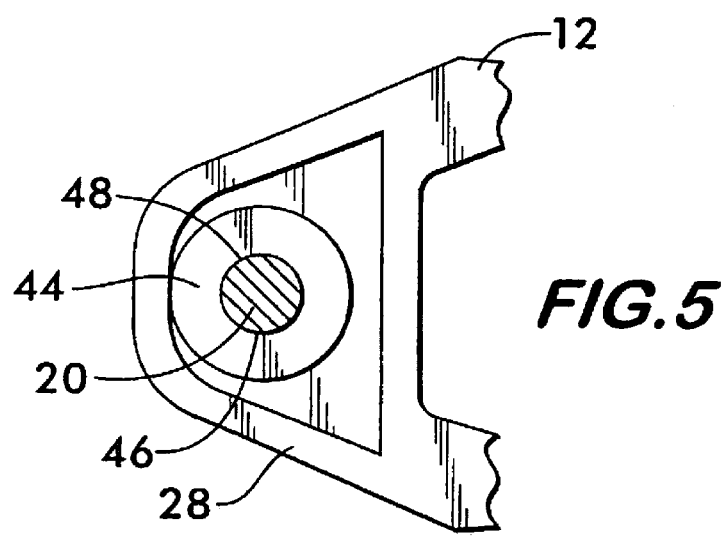
FIG. 5 is a view taken at line 5-5 of FIG. 4.

FIGS. 4 and 5 show another stop assembly embodiment 42 having retention elements in the form of one or more collars 44. The collars are preferably cylindrical in shape and have an axially extending bore 46 therethrough. Bore 46 provides an inwardly facing surface 48 that engages the shank 20 of fasteners 16. The bore has a diameter smaller than the diameter of the shank so as to create an interference fit between the collar and the fastener which allows the collar to grip the fastener and maintain the coupling segments 12 and 14 in spaced relation until sufficient force is applied to move the segments toward one another for engagement with pipe elements. The annular surfaces 46 at the ends of the collars engage the segments and, being larger than the opening through the couplings, limit the motion of the shank relatively to the couplings.

Preferably the collars are formed from an elastic material allowing them to be biased into gripping engagement with the fasteners, yet expandable so as to slide over the fasteners when the coupling segments are moved into engagement with the pipe elements. The degree of force required to move the collars 44, or the aforementioned O-rings 36 is largely a function of the degree of interference, the coefficient of friction between the surfaces in contact, and the elastic modulus of the material forming the collars or the O-rings.

Figure 6:
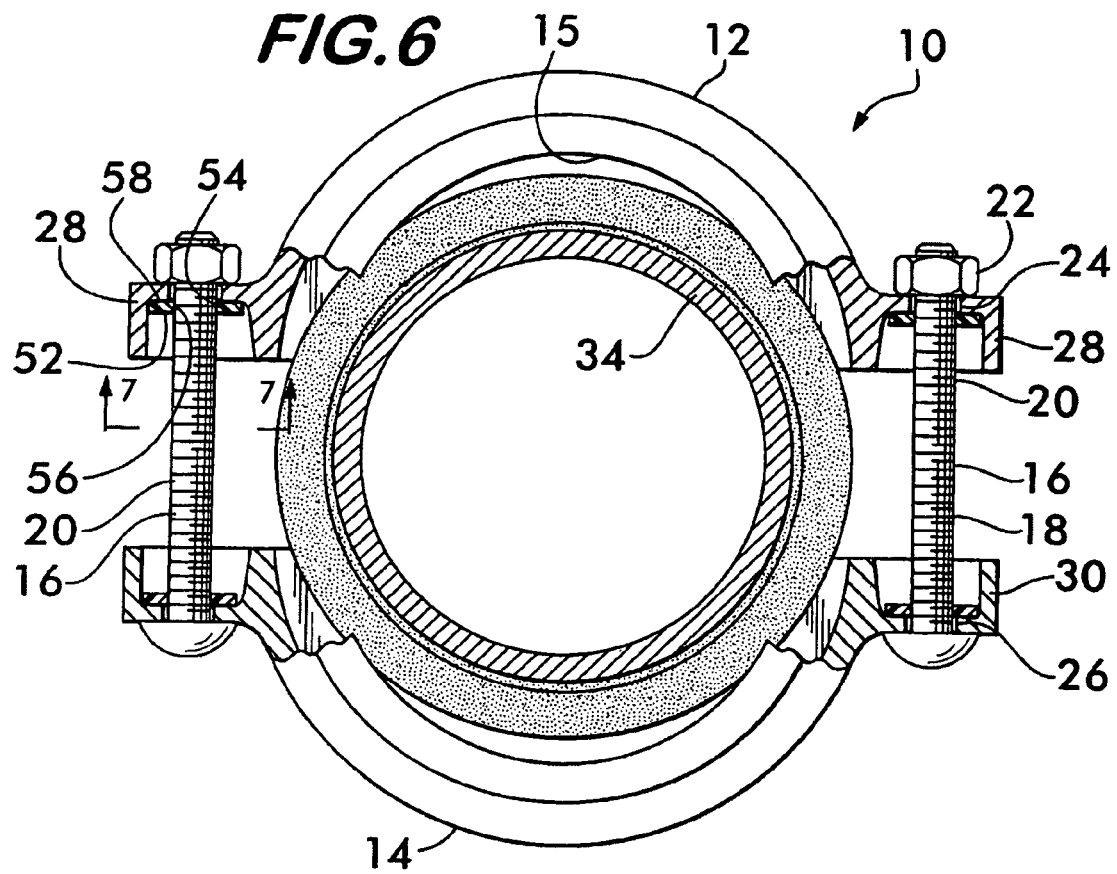
FIG. 6 is a partial sectional side view of a pipe coupling having another embodiment of a stop assembly.
Figure 7:
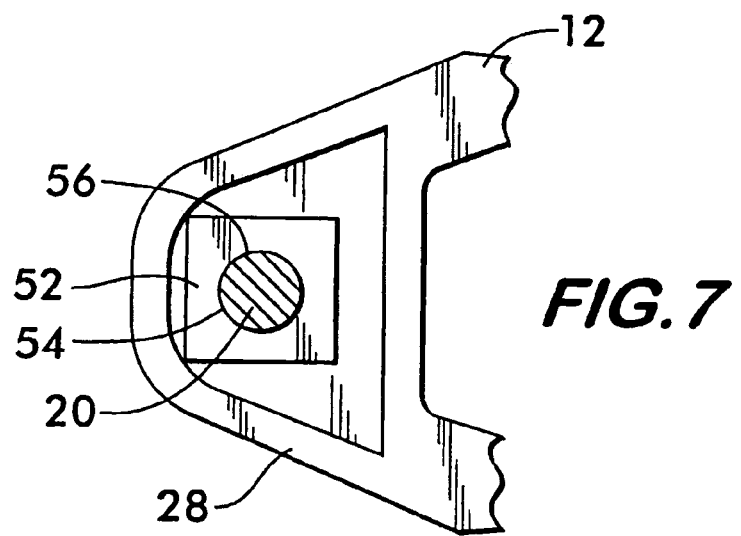
FIG. 7 is a view taken at line 7-7 of FIG. 6.

FIGS. 6 and 7 illustrate another embodiment of a retention element comprising a flexible elastic plate 48 having an opening 50 therein that receives the shank 20 of fastener 16. Plate 48 is preferably thin and sufficiently flexible and elastic so as to be slidable along shank 20, but maintain its position on the shank in the absence of sufficient applied force. The plate is preferably made from a polymer material but could also be made of metal. The opening 50 defines an inwardly facing edge 52 that engages the shank. The plate surface 54 engages the couplings to limit their motion relatively to the shank.

The retention element shown in FIGS. 8 and 9 comprises an adhesive slug 56 applied to both the shank 20 and the coupling segments 12 and 14. The slug has the characteristics of a fillet, with a first surface 58 engaged with the shank and a second surface 60 engaged with the couplings. The slug adheres to both the coupling segments and the fasteners to maintain the segments in spaced relation, but the adhesive joint is weaker than the material which it bonds together so that, upon the application of force, the bond between the adhesive and either or both the fastener and the coupling segments are broken allowing the segments to move relatively to the fasteners.

In FIGS. 10 and 11 the retention element comprises a washer 62 having a plurality of flexible, resilient teeth 64 that face inwardly and define an inner diameter of the washer that is smaller than the diameter of the shank. The edges 66 of teeth 64 engage the shank and the annular surface 68 of the washer engages the coupling segments, thereby limiting relative motion of the two components.

The teeth are resiliently flexible however, and will bend to allow the washer to move along the shank upon the application of sufficient force. The washers may comprise metal or polymeric material.

Figure 12:
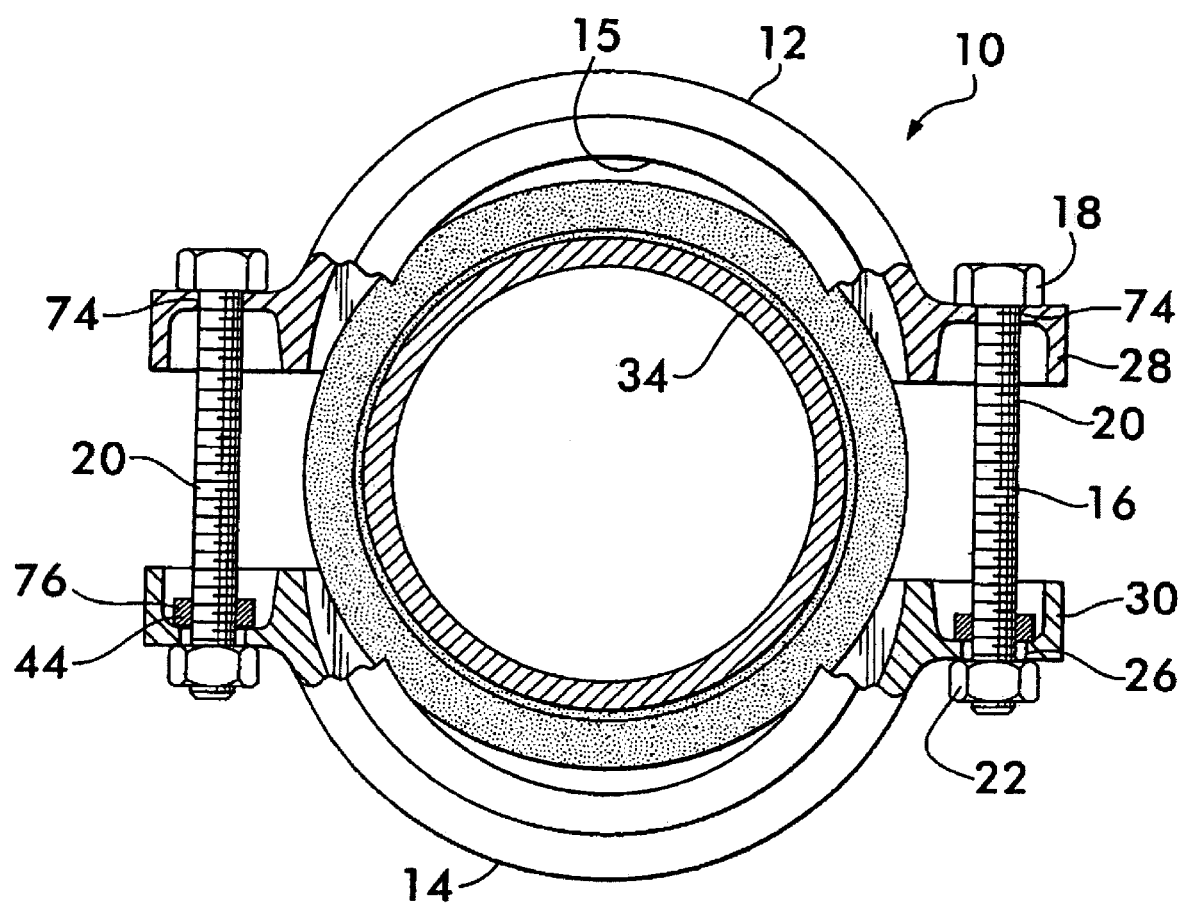
FIG. 12 is a partial sectional side view of a pipe coupling having another embodiment of a stop assembly.

FIG. 12 illustrates a stop assembly embodiment wherein the shank 20 is attached to one of the coupling elements 12. In this example the shank is threadedly engaged in a tapped opening 70 in the coupling segment 12, but it could alternately comprise a stud integrally formed with the coupling segment. A retention element 72 is mounted on the shank 20 and engages the other coupling segment 14 to maintain it in spaced relation until force is applied to engage the segments with pipe elements as described above. Although a collar 44 is illustrated as comprising the retention element, any of the examples of retention elements could also be used with this embodiment.

Figure 13:
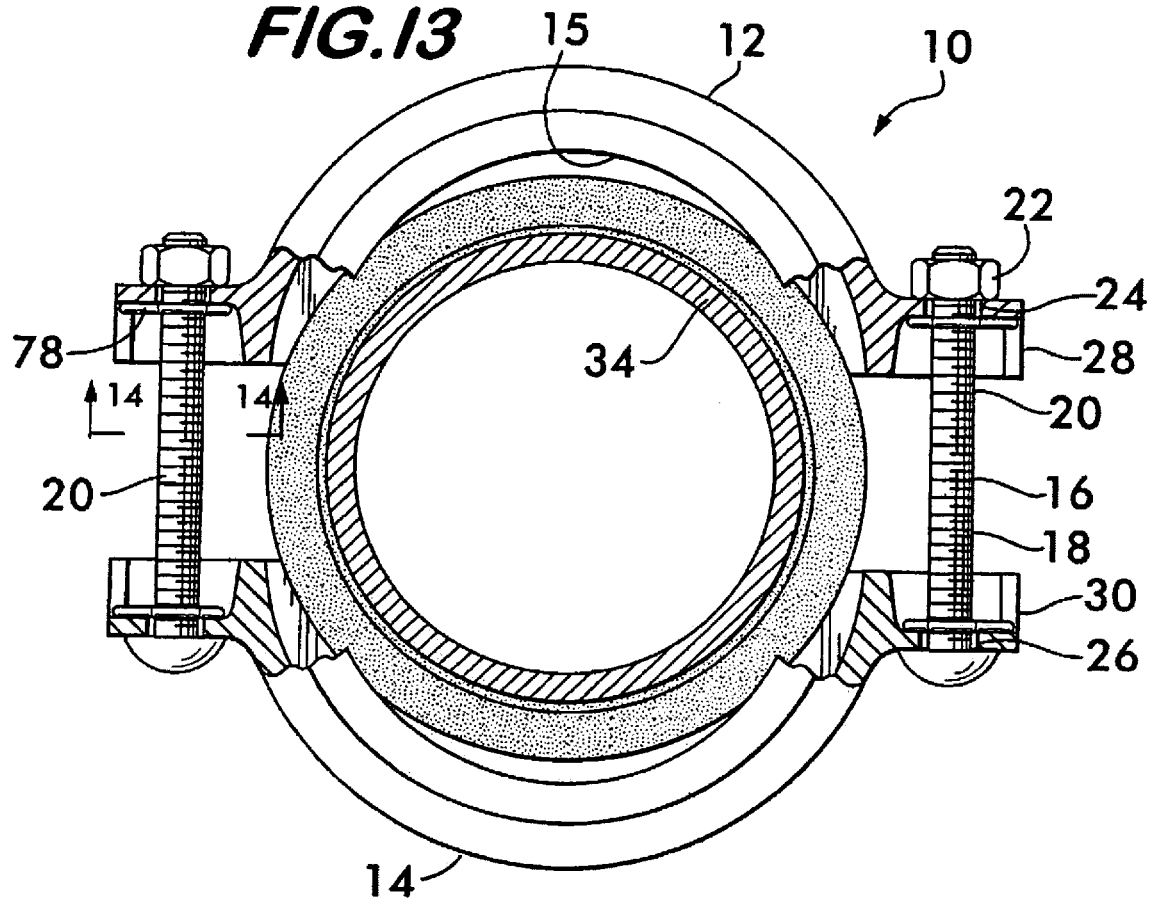
FIG. 13 is a partial sectional side view of a pipe coupling having another embodiment of a stop assembly.
Figure 14:
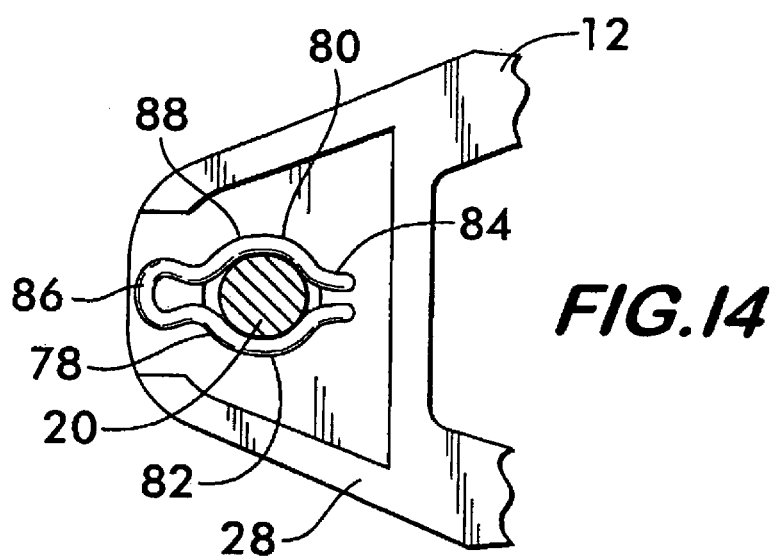
FIG. 14 is a view taken at line 14-14 of FIG. 13.

FIGS. 13 and 14 show a retention element comprising a clip 72 having legs 74 and 76. The legs are flexible and resiliently biased to engage the shank 20 on opposite sides from one another. The clip also engages the coupling segments 12 and 14 to limit their motion relatively to the shank. Motion of the segments is permitted by removing the clip from the shank. This may be effected manually or with hand tools such as a pair of pliers. Preferably the clip is formed from a wire 78 made of spring steel. Wire 78 has a reverse curve 80 that defines legs 74 and 78. Preferably the legs themselves have a curvature 82 that accommodates the shank and thereby increases the hold of the clip thereto.

Figure 15:
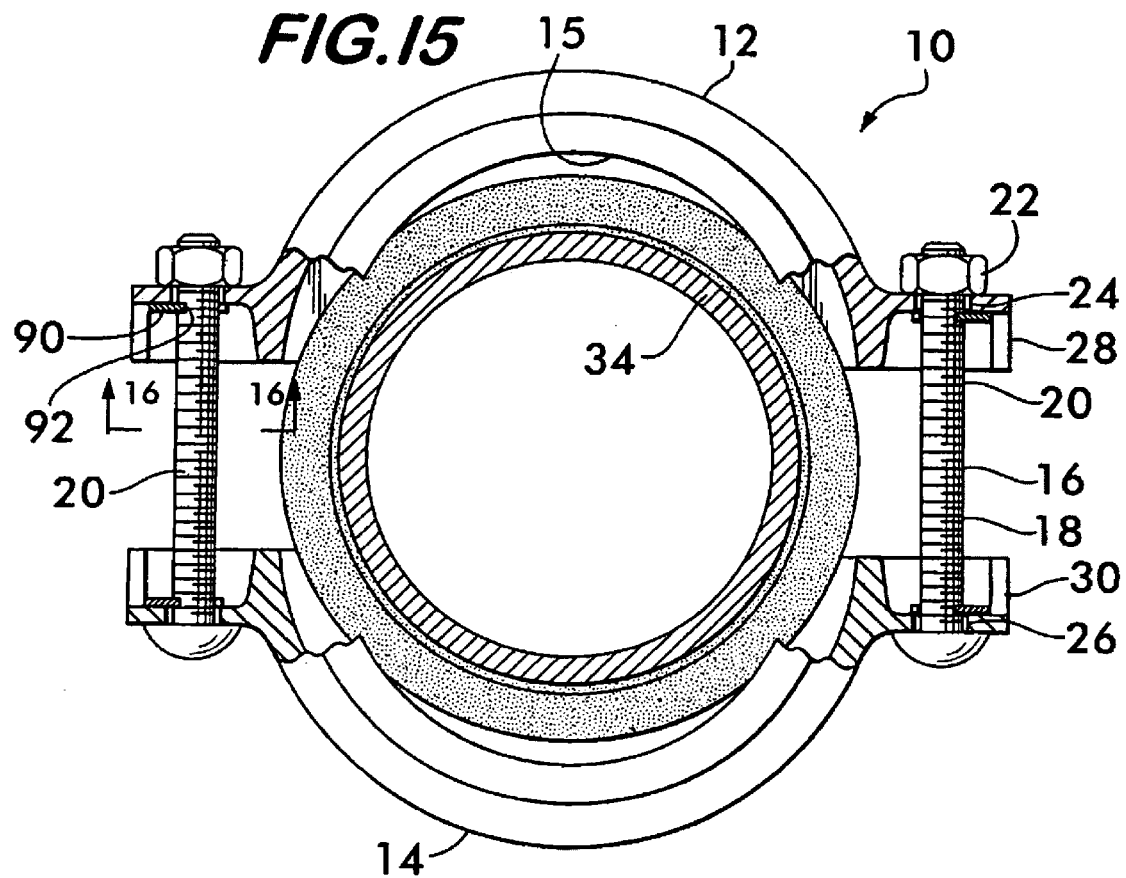
FIG. 15 is a partial sectional side view of a pipe coupling having another embodiment of a stop assembly.
Figure 16:
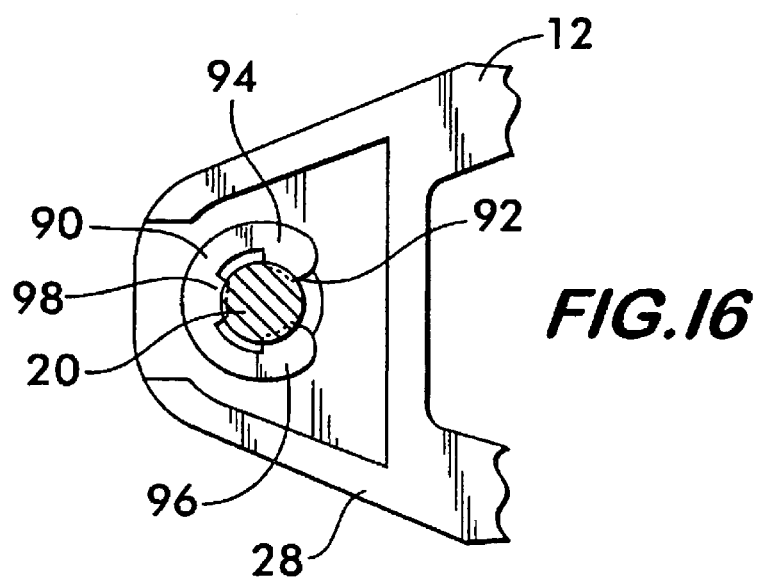
FIG. 16 is a view taken at line 16-16 of FIG. 15.

FIGS. 15 and 16 show another clip-type retention element embodiment comprising a plate 84 having a slot 86 therein defining legs 88 and 90. The shank 20 is received within slot 86. The clip may be removed by sliding the shank through the slot, thereby permitting motion of the shank relatively to the coupling segments. Preferably the plate 84 is formed of metal and is resilient and flexible.

Figure 17:
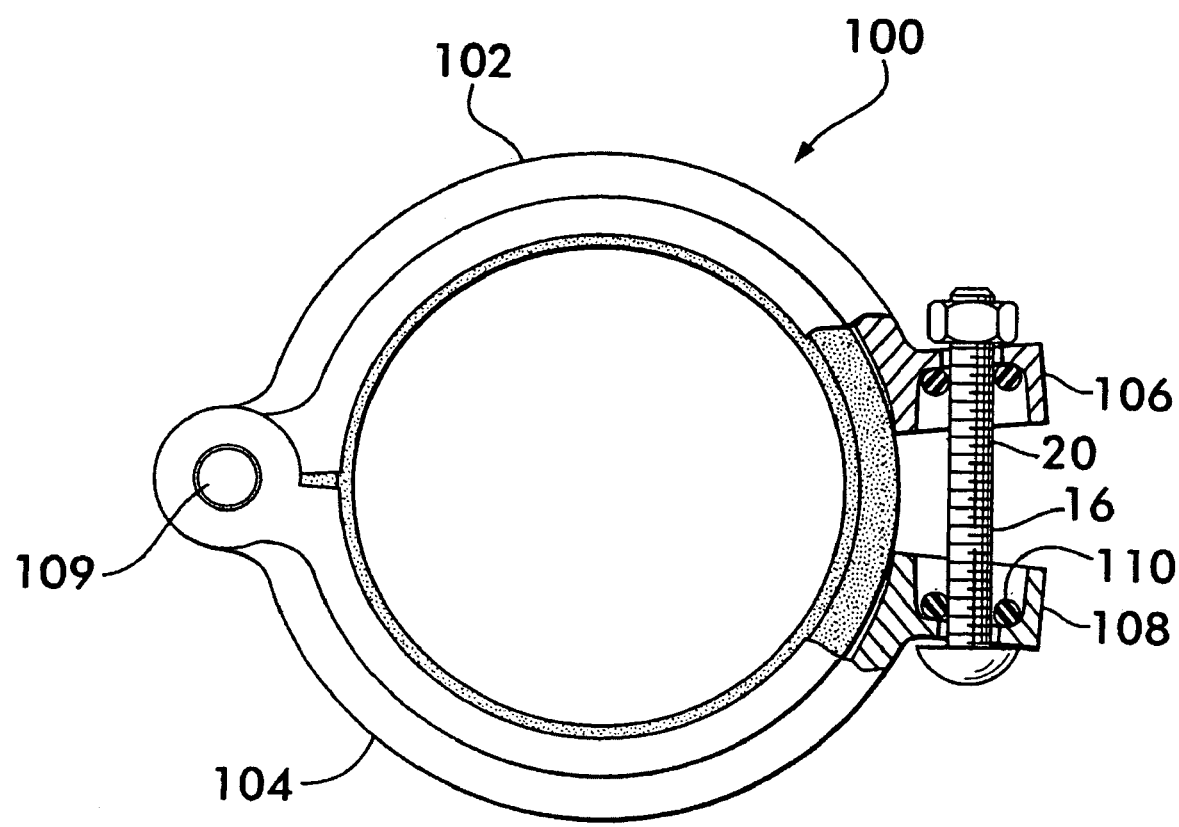
FIG. 17 is a partial sectional side view of a pipe coupling having a stop assembly.

FIG. 17 shows a coupling embodiment 92 wherein the segments 94 and 96 are joined at one end by a hinge 98. The opposite ends 100 and 102 are held in spaced relation by retention elements 104 engaged with shank 20 of fastener 16 that is used to draw the coupling segments 94 and 96 together for engagement with pipe elements to form a pipe joint. Retention elements 94 may comprise any of the embodiments described herein.

Stop assemblies according to the invention allow pipe couplings to be held in spaced relation until force is applied to bring them toward one another for engagement with pipe elements. This allows the couplings to be preassembled at the factory and handled in the field as a single unit, thereby facilitating rapid and convenient assembly of pipe joints by inserting the pipe elements between the coupling segments while they are in spaced apart relation and then forcing the coupling elements into engagement with the pipe elements, by, for example removing the retention elements from the shanks, or sliding the retention elements along the shanks to permit relative motion between the coupling segments and the shanks.

What is claimed is:

1. A method of assembling a pipe coupling formed of a first and a second segment joined to one another in end to end relation by first and second fasteners located at opposite ends of the segments, said method comprising:
   engaging said first and second fasteners with said ends of said first segment;
   engaging first retention elements respectively with said first and second fasteners and said first segment, said first retention elements contacting both said fasteners and said first segment so as to inhibit relative motion between said first segment and said first and second fasteners;
   engaging second retention elements respectively with said first and second fasteners, said second retention elements being positioned in spaced apart relation from and in facing relationship with said first retention elements;
   engaging said second segment with said first and second fasteners and said second retention elements such that said first and second retention elements are positioned between said first and second segments, said second retention elements inhibiting relative motion between said second segment and said fasteners, thereby holding said first and second segments in spaced apart relation from one another; and
   securing said second segment to said first and second fasteners.

2. The method according to claim 1, wherein engaging said first and second fasteners with said ends of said first segment comprises positioning first and second bolts through respective first and second openings in said ends of said first segment.

3. The method according to claim 2, wherein engaging said second segment with said first and second fasteners comprises positioning said first and second bolts though respective first and second openings in said ends of said second segment.

4. The method according to claim 3, wherein securing said second segment to said first and second fasteners comprises engaging a first nut with said first fastener and a second nut with said second fastener.

5. The method according to claim 4, wherein engaging said first retention elements with said first and second fasteners comprises positioning a first o-ring on said first bolt and a second o-ring on said second bolt.

6. The method according to claim 5, wherein engaging said second retention elements with said first and second fasteners comprises positioning a third o-ring on said first bolt in spaced apart relation to said first o-ring, and positioning a fourth o-ring on said second bolt in spaced apart relation to said second o-ring.

7. The method according to claim 4, wherein engaging said first retention elements with said first and second fasteners comprises positioning a first elastic collar on said first bolt and a second elastic collar on said second bolt.

8. The method according to claim 7, wherein engaging said second retention elements with said first and second fasteners comprises positioning a third elastic collar on said first bolt in spaced apart relation to said first elastic collar, and positioning a fourth elastic collar on said second bolt in spaced apart relation to said second elastic collar.

9. The method according to claim 4, wherein engaging said first retention elements with said first and second fasteners comprises positioning a first flexible plate on said first bolt and a second flexible plate on said second bolt.

10. The method according to claim 9, wherein engaging said second retention elements with said first and second fasteners comprises positioning a third flexible plate on said first bolt in spaced apart relation to said first flexible plate, and positioning a fourth flexible plate on said second bolt in spaced apart relation to said second flexible plate.

11. The method according to claim 4, wherein engaging said first retention elements with said first and second fasteners comprises positioning a frangible material on said first and second bolts in contact with said first segment.

12. The method according to claim 11, wherein engaging said second retention elements with said first and second fasteners comprises positioning said frangible material on said first and second bolts and said second segment.

13. The method according to claim 12, wherein positioning said frangible material on said first and second bolts comprises positioning a material on said bolts selected from the group consisting of adhesives, solder, paint, caulk and combinations thereof.

14. The method according to claim 4, wherein engaging said first retention elements with said first and second fasteners comprises positioning a first washer having a plurality of inwardly projecting, flexible teeth on said first bolt and a second washer having a plurality of inwardly projecting, flexible teeth on said second bolt, said teeth of said first and second washers respectively engaging said first and said second bolts.

15. The method according to claim 14, wherein engaging said second retention elements with said first and second fasteners comprises positioning a third washer having a plurality of inwardly projecting, flexible teeth on said first bolt in spaced apart relation to said first washer, and positioning a fourth washer having a plurality of inwardly projecting, flexible teeth on said second bolt in spaced apart relation to said second washer, said teeth of said third and fourth washers respectively engaging said first and said second bolts.

16. The method according to claim 4, wherein engaging said first retention elements with said first and second fasteners comprises positioning a first clip having a pair of flexible legs on said first bolt and a second clip having a pair of flexible legs on said second bolt, said legs of said first and second clips respectively engaging said first and said second bolts.

17. The method according to claim 16, wherein engaging said second retention elements with said first and second fasteners comprises positioning a third clip having a pair of flexible legs on said first bolt in spaced apart relation to said first clip, and positioning a fourth clip having a pair of flexible legs on said second bolt in spaced apart relation to said second clip, said legs of said third and fourth clips respectively engaging said first and said second bolts.

18. The method according to claim 1, further comprising:
inserting a first pipe element between said first and second segments;
inserting a second pipe element between said first and second segments;
applying force to said first and second segments so as to overcome resistance of said retention elements and move said first and second segments toward each other and into engagement with said pipe elements to effect a joint therebetween.

19. The method according to claim 18, wherein said force is applied by tightening said fasteners.

* * * * *